United States Patent
Lurie et al.

(10) Patent No.: US 9,255,018 B2
(45) Date of Patent: Feb. 9, 2016

(54) COST-EFFICIENT TREATMENT OF FLUORIDE WASTE

(75) Inventors: Michael Lurie, Kiryat Blalika (IL); Milan Shtal, Yoknam (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 1084 days.

(21) Appl. No.: 13/333,556

(22) Filed: Dec. 21, 2011

(65) Prior Publication Data

US 2013/0161264 A1    Jun. 27, 2013

(51) Int. Cl.
*C02F 1/58* (2006.01)
*C02F 1/52* (2006.01)
*C02F 1/66* (2006.01)
*C02F 11/12* (2006.01)
*C02F 101/14* (2006.01)

(52) U.S. Cl.
CPC .............. *C02F 1/5236* (2013.01); *C02F 1/66* (2013.01); *C02F 11/121* (2013.01); *C02F 2101/14* (2013.01)

(58) Field of Classification Search
None
See application file for complete search history.

(56) References Cited

U.S. PATENT DOCUMENTS

| 4,234,419 | A  | * | 11/1980 | Coillet | 210/664 |
|---|---|---|---|---|---|
| 6,331,256 | B1 | * | 12/2001 | Kezuka et al. | 210/712 |
| 6,344,142 | B1 | * | 2/2002 | Yamasaki et al. | 210/614 |
| 6,645,385 | B2 |   | 11/2003 | Krulik et al. | |
| 7,182,873 | B2 |   | 2/2007 | Hsien et al. | |
| 2004/0040912 | A1 | * | 3/2004 | McConchie et al. | 210/724 |
| 2008/0296232 | A1 | * | 12/2008 | Wegner | 210/725 |
| 2011/0180470 | A1 | * | 7/2011 | Harris | 210/199 |

* cited by examiner

*Primary Examiner* — Tony G Soohoo
*Assistant Examiner* — Peter Keyworth
(74) *Attorney, Agent, or Firm* — Bever, Hoffman & Harms, LLP

(57) ABSTRACT

A method and system for processing fluoride-containing wastewater includes treating the wastewater with brine (waste) created by the regeneration process implemented by in ion exchanging water softener. The brine, which is typically disposed of, contains both calcium and magnesium salts, in varying concentrations and ratios. The regeneration process brine is added to the fluoride-containing wastewater within a reaction tank, and the fluoride ion concentration is monitored. When the fluoride ion concentration falls below a predetermined level (e.g., 15 ppm), the flow of regeneration process brine is stopped. A pH controller monitors the pH within the reaction tank, and adds a basic agent to ensure that the pH remains above a predetermined level (e.g., pH>9). The pH control results in a clear effluent, and a sludge having a high settling rate and a high dewater ability.

11 Claims, 3 Drawing Sheets

COST-EFFICIENT TREATMENT OF FLUORIDE WASTE

FIELD OF THE INVENTION

The present invention relates to methods for efficiently treating fluoride-containing waste.

RELATED ART

Fluoride found in wastewater generated by semiconductor fabrication plants (or other industrial plants) must be removed before the wastewater may be safely disposed. In many cases fluoride-containing wastewater is treated by a calcium salt addition process, followed by precipitation of calcium fluoride and further dewatering by filter press. The cost of chemicals (e.g., calcium salt) is a significant part of total cost of waste treatment. Precise and complicated control of the chemical dosing is typically required due to variations in fluoride concentration in the wastewater feed.

Application of adding calcium salt for the removal of fluoride is known in waste treatment. For example, a system and method for removing fluoride from wastewater by the addition of calcium salts is described by G. A. Krulik, et al., in U.S. Pat. No. 6,645,385. Krulik et al. teach a single fluoride sensing electrode disposed at the reaction tank for measuring a concentration of fluoride in the influent wastewater, and a programmable controller that defines a setpoint of fluoride concentration in the reaction tank, and automatically controls the addition of calcium salts based on the setpoint and an output signal provided by the single fluoride sensing electrode.

Another method of treating fluoride-containing wastewater is described by Hsein et al., in U.S. Pat. No. 7,182,873. Hsein et al. teach that a primary fluoric ion concentration detection process is initially performed upon the wastewater. The wastewater is then introduced into a first reaction tank, and a primary calcium salt addition process is performed to add calcium salt into the first reaction tank, wherein the dosage of the calcium salt is determined according the fluoric ion concentration detected during the primary fluoric ion concentration detection process. The wastewater and calcium fluoride are then delivered into a second reaction tank, and a secondary calcium salt addition process is performed. A solid-liquid separation process is then performed, and a secondary fluoric ion concentration detection process is then performed upon the wastewater. The dosage of the calcium salt in the secondary calcium salt addition process is determined in a feed back control manner according to a fluoric ion concentration detected in the secondary fluoric ion concentration detection process.

Both Krulik et al. and Hsein et al. only consider the use of calcium salts for use in fluoride waste treatment. Moreover, both Krulik et al. and Hsein et al. require the measuring of fluoride concentration in the influent wastewater, and dosing with calcium salt with a known concentration based on the measured fluoride concentration of the influent wastewater. This undesirably results in relatively complicated and costly fluoride treatment systems.

It would therefore be desirable to have an improved system and method for treating fluoride-containing wastewater, which does not exhibit the above-described deficiencies of conventional fluoride treatment systems.

SUMMARY

Accordingly, the present invention provides an efficient system for treating fluoride-containing wastewater that uses the waste produced by a regeneration cycle in an ion exchange water softener, instead of calcium salts. The waste (brine) produced by the regeneration cycle of an ion exchange water softener contains both calcium and magnesium salts, which react with fluoride present in the fluoride-containing wastewater. The brine produced by the regeneration cycle of an ion exchange water softener (hereinafter referred to as regeneration process brine) is readily available and inexpensive. For example, regeneration process brine is typically available from an ultrapure water (UPW) plant that softens raw water at a semiconductor fabrication facility.

In accordance with one embodiment, the regeneration process brine is initially neutralized to a pH up to about 7. The fluoride-containing wastewater is pumped into a reaction tank, and the regeneration process brine is then added to the reaction tank. The regeneration process brine has varying concentrations and ratios of calcium and magnesium salts. As a result, the dose of the regeneration process brine cannot be predetermined based on the fluoride concentration of the influent fluoride-containing wastewater. Consequently, the fluoride ion concentration of the influent fluoride-containing wastewater is not measured in accordance with the present invention.

Rather, the dose of the regeneration process brine is defined by a predetermined setpoint of the residual concentration of fluoride in treated effluent only. That is, regeneration process brine is added to the reaction tank until a predetermined setpoint of residual fluoride concentration is achieved in the reaction tank.

The pH of the contents of the reaction tank is also adjusted to have a value greater than 9, thereby providing efficient clarification (i.e., low turbidity) of the effluent, a high settling rate of the resulting sludge, and a high dewater ability of the resulting sludge.

The present invention results in cost savings associated with the purchase of calcium salts, as well as the ability to eliminate the system required for the storage and dosing of these calcium salts. In addition, cost savings are realized because there is no need to dispose of regeneration process brine as a waste product. Moreover, the dosing system is simplified, as there is no need to measure the fluoride concentration of the influent wastewater.

The present invention will be more fully understood in view of the following description and drawings.

DETAILED DESCRIPTION

Figure 1:
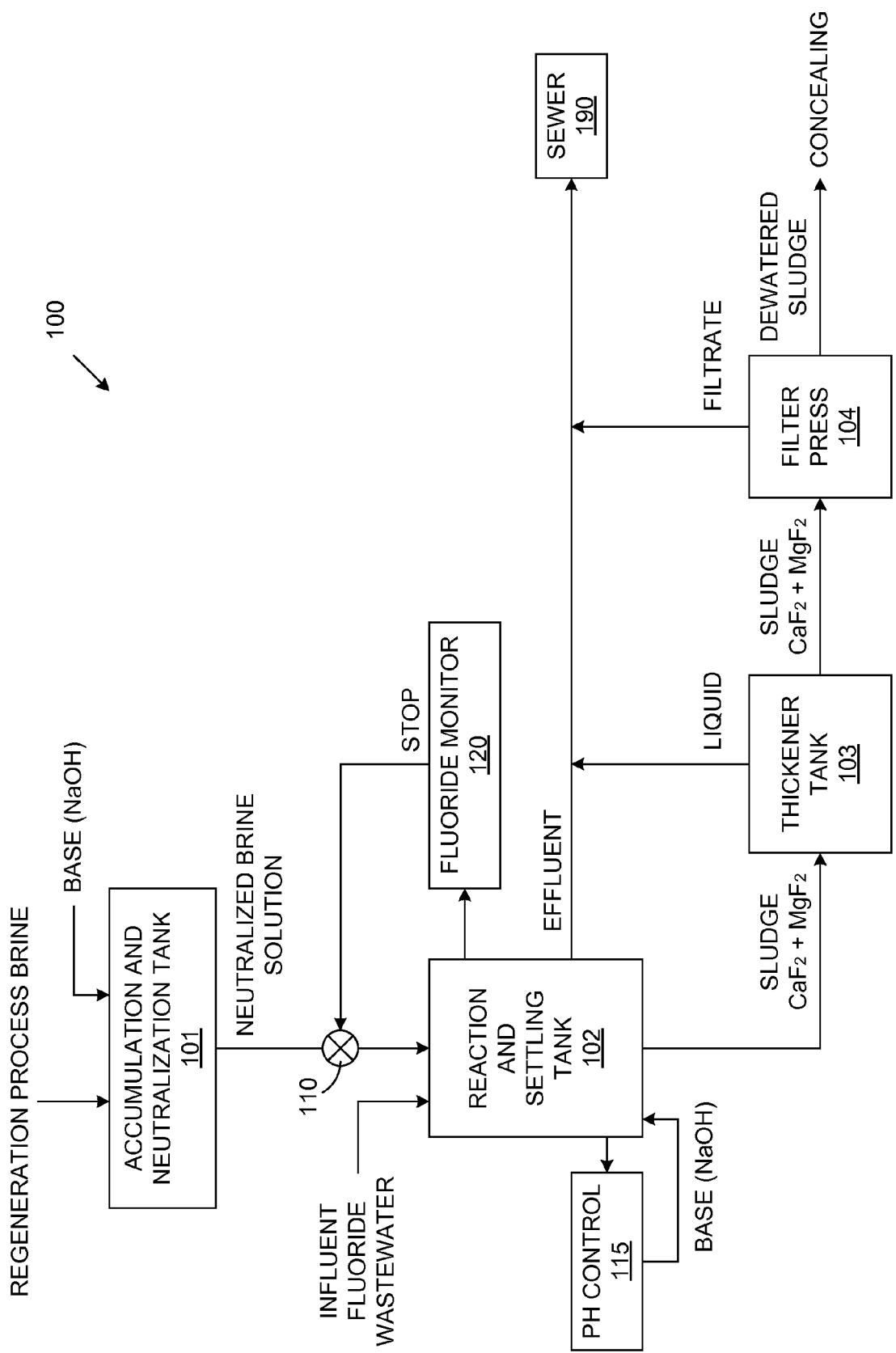
FIG. 1 is a flow diagram illustrating a system and method for treating fluoride-containing wastewater in accordance with a first embodiment of the present invention.

The ion exchange water softener is one of the most common tools used in water treatment. The function of an ion exchange water softener is to remove scale-forming calcium and magnesium ions from hard water, thereby 'softening' the water. An ion exchange water softener typically includes a tank that contains small beads of synthetic treated resin. The resin is initially treated to adsorb hydrogen or sodium ions. Hard water containing calcium and magnesium ions are passed through the resin. The resin has a greater affinity for multi-valent ions, such as calcium and magnesium ions, than it does for hydrogen or sodium ions. As a result, the calcium and magnesium ions adhere to the resin, releasing the hydrogen or sodium ions. In this manner, the water softener exchanges the hydrogen or sodium ions for the calcium and magnesium ions present in the water.

After equilibrium has been reached (i.e., after the quantity of calcium and magnesium ions adsorbed by the resin is large enough that ion exchange no longer takes place), the resin can be regenerated. During the regeneration process, HCl or NaCl solution is passed through the resin, exchanging the calcium and magnesium ions previously adsorbed by the resin with the hydrogen or sodium ions. The resin's affinity for the calcium and magnesium ions is overcome by using a highly concentrated HCl or NaCl solution. At the end of the regeneration process, the resin has adsorbed hydrogen or sodium ions, and may be re-used to treat hard water in the manner described above. The waste product of the regeneration process is brine (hereinafter referred to as "regeneration process brine") that includes both calcium and magnesium salts. Regeneration process brine is typically generated at a UPW plant that softens raw water at a semiconductor fabrication facility. Regeneration process brine can also be obtained inexpensively from other industrial plants that implement water softening.

The present invention implements fluoride waste treatment without use of costly chemicals and complicated control systems. Regeneration process brine is used as a chemical for precipitation of fluoride from fluoride-containing wastewater. Process control is based on measurement of residual fluoride concentration and pH in a reaction tank. Regeneration process brine is added to fluoride-containing wastewater until achieving a setpoint of residual fluoride concentration in a reaction tank. The pH is then adjusted to an optimal range of greater than 9 to provide efficient separation of solids from effluent and for obtaining sludge with a high dewater ability.

In accordance with the present invention, the regeneration process brine has varying concentrations of both calcium and magnesium salts. Moreover, the ratio of calcium salts to magnesium salts within the regeneration process brine is variable. As a result, the dose of the regeneration process brine cannot be predetermined based on the concentration of fluoride in the influent fluoride-containing wastewater. Instead the dose of the regeneration process brine is defined only by a setpoint of residual concentration of fluoride in the treated effluent wastewater. Optimizing the pH range assures a high settling rate of the sludge, low turbidity of the effluent, and high de-water ability of the sludge.

By treating the fluoride containing wastewater with regeneration process brine, it is unnecessary to purchase costly calcium salts. Moreover, it is unnecessary to provide a system for storage and dosing of these calcium salts. In addition, cost savings are realized because there is no need to dispose of the already available regeneration process brine.

Furthermore, maintaining an optimal pH range (pH>9) provides additional savings because there is no need to provide additional chemicals for coagulation and flocculation of solids, or a control system for introducing such additional chemicals.

Several specific embodiments of the present invention will now be described in detail.

FIG. 1 is a block diagram of a fluoride wastewater treatment system 100 in accordance with a first embodiment of the present invention. As illustrated in FIG. 1, regeneration process brine (obtained from the regeneration process of an ion exchange softener used for pretreatment of raw water in a UPW plant of a semiconductor fabrication facility) is added to accumulation and neutralization tank 101. Hydrochloric acid, which is inherently present in the regeneration process brine, causes this brine to have a relatively low pH. The regeneration process brine is neutralized with a basic agent to create a neutralized brine solution having a pH of up to about 7. In accordance with one embodiment, the basic agent added to tank 101 is NaOH. However, it is understood that other basic agents can be used in other embodiments.

Influent fluoride wastewater is pumped into reaction and settling tank 102. In the described embodiment, this fluoride wastewater contains about 30,000 ppm of fluoride, mostly in sodium form, and the pH of this fluoride wastewater is about 10. The neutralized brine solution is then added to the reaction and settling tank 102 through a flow control device 110, while a mixer is controlled to mix the contents of this tank 102. During this process, pH controller 115 monitors the pH level of the mixture in the tank 102. PH controller 115 causes a basic agent (e.g., NaOH) to be added to the reaction and settling tank 102, as necessary, to maintain a pH greater than 9. Note that because the regeneration process brine is initially neutralized to a pH of about 7 (in tank 101), the regeneration process brine added to the reaction and settling tank 102 does not drastically reduce the pH of the influent fluoride wastewater. As a result, it becomes easier for pH controller 115 to maintain a pH greater than 9 within tank 102.

During the above-described process, a fluoride monitor 120 detects the residual fluoride ion concentration of the contents of the reaction and settling tank 102. In response to detecting that the residual fluoride ion concentration of the mixture in tank 102 has been reduced to a predetermined level (for example 20 ppm), fluoride monitor 120 activates a control signal (STOP), which causes flow control device 110 to stop the flow of neutralized brine solution to the reaction and settling tank 102 (i.e., to stop the dosing of the neutralized brine solution). At this time, the mixer within the reaction and settling tank 102 is switched off, and sludge, comprising mostly of calcium fluoride ($CaF_2$) and magnesium fluoride ($MgF_2$), is separated from the effluent by sedimentation. The separated effluent can be safely discarded from the tank 102 into the sewer system 190.

After the separated effluent has been removed from the reaction and settling tank 102, the remaining sludge is transferred from tank 102 into a thickener tank 103, wherein further concentration of the sludge occurs. Liquid removed from the sludge within the thickener tank 103 can be safely discarded into the sewer system 190. The sediment remaining in the thickener tank 103 is transferred from the thickener tank 103 to a filter press 104, wherein de-watering of the sludge is performed. The filtrate extracted from the sludge within the filter press 104 can be safely discarded into the sewer system 190. The de-watered sludge remaining in the filter press 104 is disposed of in an appropriate manner. For example, the de-watered sludge can be used in the manufacturing of cement or disposed of according to environmental requirements.

In accordance with one embodiment of the present invention, maintaining a pH greater than 9 within the reaction and settling tank 102 advantageously provides a clear effluent, a high settling rate, and a sludge with a high de-water ability, without requiring the use of coagulants and/or flocculants.

Figure 2:
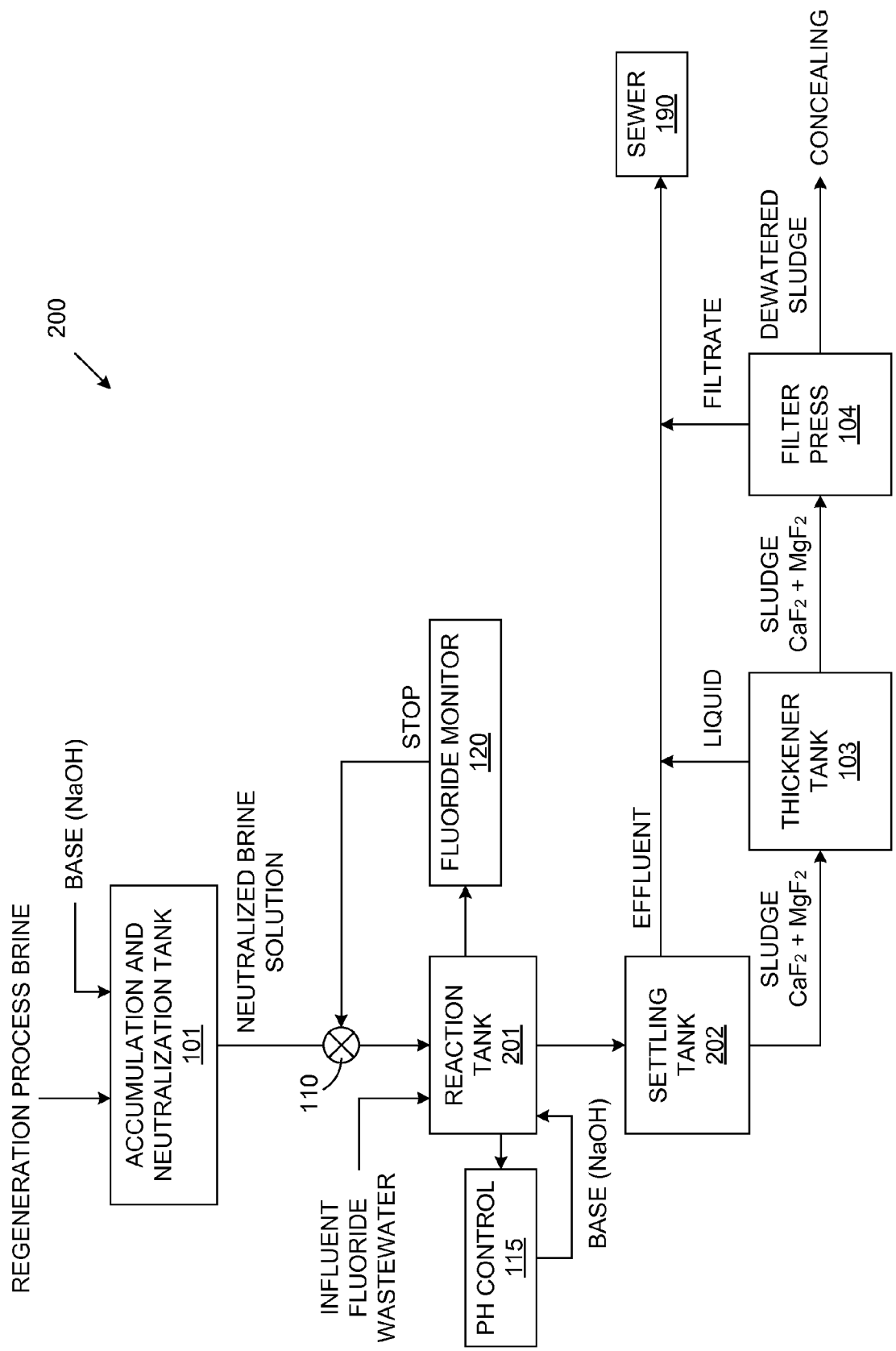
FIG. 2 is a flow diagram illustrating a system and method for treating fluoride-containing wastewater in accordance with a second embodiment of the present invention.

FIG. 2 is a block diagram of a fluoride wastewater treatment system 200 in accordance with a second embodiment of the present invention. Because system 200 is similar to system 100, similar elements in FIGS. 1 and 2 are labeled with similar reference numbers. System 200 replaces the reaction and settling tank 102 of system 100 with two separate tanks.

Thus, system 200 includes reaction tank 201 and settling tank 202. Processing proceeds in the manner described above in connection with FIG. 1, wherein the influent fluoride-containing wastewater is pumped into reaction tank 201, and the neutralized regeneration process brine is then added to the reaction tank 201, while a mixer is controlled to mix the contents of reaction tank 201. During this process, pH controller 115 monitors the pH level of the mixture in the reaction tank 201. Again, pH controller 115 adds a basic agent (e.g., NaOH) to the reaction 201, as necessary, to maintain a pH greater than 9.

During the above-described process, the fluoride monitor 120 detects the residual fluoride ion concentration of the contents of the reaction tank 201. In response to detecting that the residual fluoride ion concentration of the mixture in the reaction tank 201 has been reduced to a predetermined level (for example 15 ppm), fluoride monitor 120 activates the control signal (STOP) to stop the flow of neutralized brine solution to the reaction tank 201. At this time, the mixer within the reaction tank 201 is switched off, and the suspension of $CaF_2$ and $MgF_2$ within the reaction tank 201 is transferred to settling tank 202. Within the settling tank 202, the sludge ($CaF_2$ and $MgF_2$) is separated from the effluent by sedimentation. The separated effluent is safely discarded from the settling tank 202 into the sewer system 190, and the sludge is processed in thickener tank 103 and filter press 104 in the manner described above in connection with FIG. 1. If the available capacity of the settling tank 202 and/or the filter press 104 is limited, coagulants and/or flocculants can be added to the suspension to facilitate the separation of the sludge from the effluent. By separating the reaction tank 201 and the settling tank 202 as set forth in system 200, the capacity of system 200 is advantageously increased (with respect to system 100).

Figure 3:
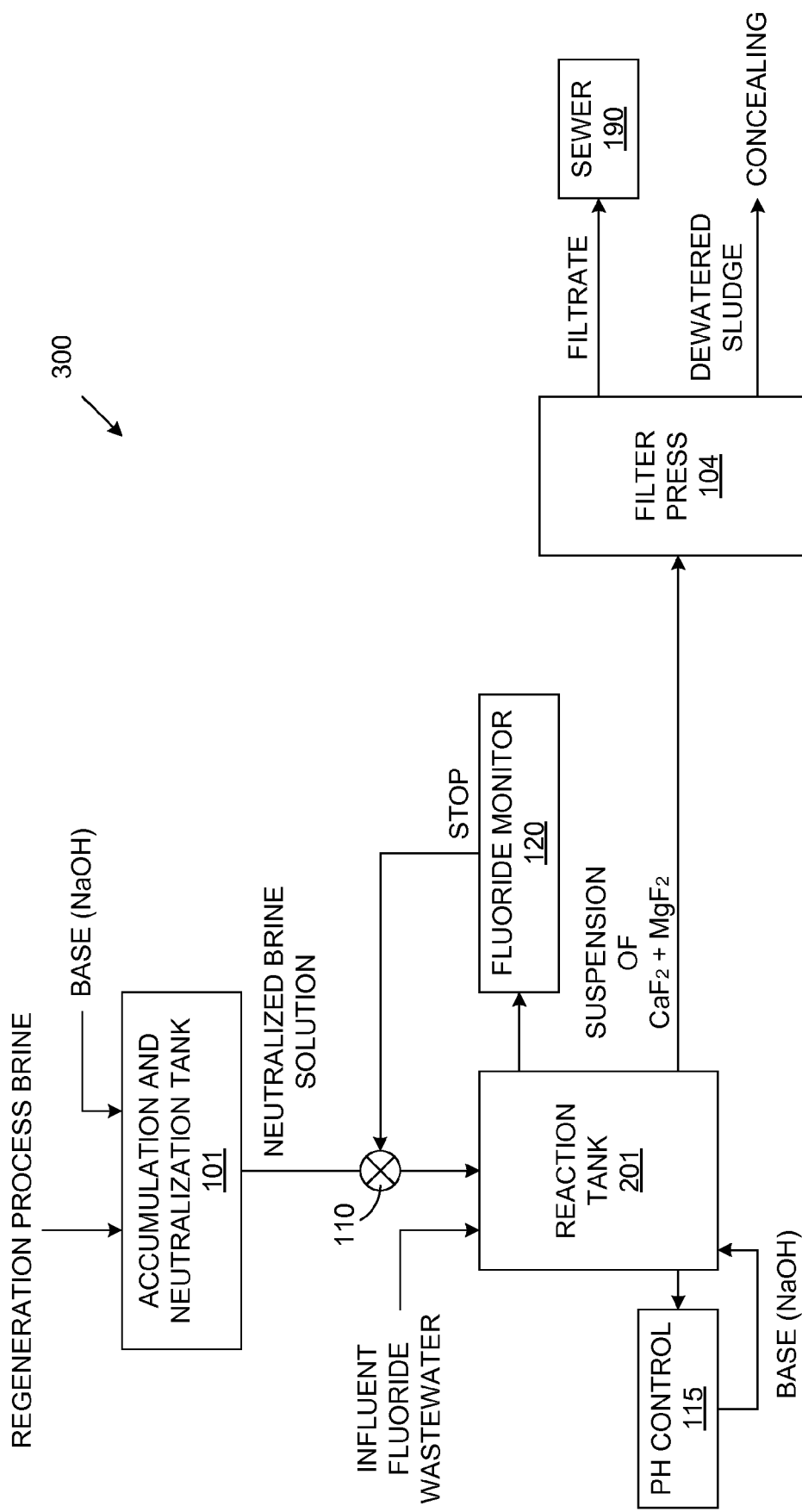
FIG. 3 is a flow diagram illustrating a system and method for treating fluoride-containing wastewater in accordance with a third embodiment of the present invention.

FIG. 3 is a block diagram of a fluoride wastewater treatment system 300 in accordance with a third embodiment of the present invention. Because system 300 is similar to systems 100 and 200, similar elements in FIGS. 1, 2 and 3 are labeled with similar reference numbers. System 300 eliminates the thickener tank 103 and the settling tank 202 from system 200. Processing proceeds in the manner described above in connection with FIG. 2, wherein the suspension of $CaF_2$ and $MgF_2$ from the reaction tank 201 is transferred directly to the filter press 104. The filtrate from the filter press 104 is safely disposed into the sewer system 190, while the dewatered sludge from the filter press 104 is properly disposed.

If the available capacity of the filter press 104 is limited, coagulants and/or flocculants can be applied to the suspension to facilitate the separation of the sludge from the filtrate. Eliminating the settling tank 202 and the thickener tank 103 from system 300 advantageously allows system 300 to simplify batch treatment process or, if required, continuously treat the fluoride wastewater. That is, there is no need to wait for sedimentation or thickening of the suspension, so the process steps can be performed with fewer delays for a more continuous process flow.

Although the invention has been described in connection with several embodiments, it is understood that this invention is not limited to the embodiments disclosed, but is capable of various modifications, which would be apparent to a person skilled in the art. Thus, the invention is limited only by the following claims.

We claim:
1. A method for removing fluoride from wastewater, comprising:
creating a brine by performing a regeneration process in an ion exchange water softener, wherein the brine is obtained as a waste product of the regeneration process, and wherein the brine contains both calcium salt and magnesium salt;
adding a basic agent to the brine obtained as a waste product of the regeneration process; and then
adding the brine to the wastewater; and
mixing the brine and wastewater, thereby creating a suspension containing calcium fluoride and magnesium fluoride.
2. The method of claim 1, further comprising:
monitoring the concentration of fluoride ions in the suspension; and
stopping the adding of the brine to the wastewater in response to detecting that the concentration of fluoride ions in the suspension reaches a predetermined level.
3. The method of claim 2, further comprising:
monitoring the pH level of the suspension; and
adding a basic agent to the suspension to ensure that the monitored pH level of the suspension remains greater than 9.
4. The method of claim 1, further comprising:
monitoring the pH level of the suspension; and
adding a basic agent to the suspension to ensure that the monitored pH level of the suspension remains greater than 9.
5. The method of claim 1, wherein adding the basic agent neutralizes the brine, such that the brine has a pH of about 7.
6. The method of claim 1, further comprising allowing the suspension to rest, such that sedimentation of the calcium fluoride and magnesium fluoride occurs, thereby forming a sludge containing calcium fluoride and magnesium fluoride.
7. The method of claim 6, further comprising:
performing the step of mixing in a reaction tank; and
allowing the suspension to rest in the reaction tank, whereby the sludge forms in the reaction tank.
8. The method of claim 6, further comprising:
performing the step of mixing in a reaction tank; and
transferring the suspension from the reaction tank to a settling tank, separate from the reaction tank; and
allowing the suspension to rest in the settling tank, whereby the sludge forms in the settling tank.
9. The method of claim 6, further comprising thickening the sludge.
10. The method of claim 9, further comprising pressing the sludge through a filter.
11. The method of claim 1, further comprising pressing the suspension through a filter.

* * * * *